(12) United States Patent
Hughes et al.

(10) Patent No.: US 9,784,622 B2
(45) Date of Patent: \*Oct. 10, 2017

(54) PHOTON ENTANGLEMENT ROUTER

(71) Applicant: THE UNITED STATES OF AMERICA AS REPRESETNED BY THE SECRETARY OF THE AIR FORCE, Rome, NY (US)

(72) Inventors: David H. Hughes, Blossvale, NY (US); Reinhard Erdmann, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,364

(22) Filed: Feb. 7, 2017

(65) Prior Publication Data

US 2017/0146407 A1   May 25, 2017

Related U.S. Application Data

(63) Continuation of application No. 14/824,390, filed on Aug. 12, 2015, now Pat. No. 9,664,566.

(51) Int. Cl.
  *G01J 4/00* (2006.01)
  *G01J 4/02* (2006.01)
  *G02B 5/30* (2006.01)
  *G02B 27/28* (2006.01)

(52) U.S. Cl.
  CPC .............. *G01J 4/02* (2013.01); *G02B 5/3083* (2013.01); *G02B 27/283* (2013.01)

(58) Field of Classification Search
  CPC ......... G01J 4/04; G01N 21/21; G01N 21/211; G01N 21/19; G01N 21/6445

USPC .......................................................... 356/365
  See application file for complete search history.

(56) References Cited

U.S. PATENT DOCUMENTS

| | | | | |
|---|---|---|---|---|
| 9,490,909 | B2* | 11/2016 | Bovino | H04L 9/0852 |
| 2004/0036877 | A1* | 2/2004 | Sergienko | G01N 21/211 |
| | | | | 356/369 |
| 2010/0309469 | A1* | 12/2010 | Kanter | H04B 10/70 |
| | | | | 356/364 |

\* cited by examiner

*Primary Examiner* — Tarifur Chowdhury
*Assistant Examiner* — Md M Rahman
(74) *Attorney, Agent, or Firm* — Joseph A. Mancini

(57) ABSTRACT

A photon entanglement router comprises a modified birefringent spectral filter followed by a polarization beam splitter (PBS). Frequency degenerate or non-degenerate entangled photons, generated by a collinear laser source and incident on one input port of the photon entanglement router, are comprised of congruent photons and/or incongruent photons. The invention adds a plurality of additional filter stacks at each output port such that they invert the action of the first birefringent stack at the input port. Intermediate output photons from the invention is input to two ports of an additional PBS where they are spatially projected according to their frequencies and polarizations. Two congruent photons of an entangled photon pair exit as an entangled pair in one direction, while two incongruent photons exit as an entangled pair in the orthogonal direction. If one photon is congruent and the other photon incongruent, the photons remain entangled but are spectrally divided into orthogonal directions. The invention's birefringent spectral filter accepts specific input frequencies from the ITU optical C-band grid for proper operation.

10 Claims, 4 Drawing Sheets

US 9,784,622 B2

PHOTON ENTANGLEMENT ROUTER

REFERENCE TO PRIOR APPLICATIONS UNDER 35 U.S.C. §120

This patent application is a Continuation Application of and claims the priority benefit of pending non-provisional application Ser. No. 14/824,390, having been filed in the United States Patent and Trademark Office on Aug. 12, 2015 and now incorporated by reference herein.

STATEMENT OF GOVERNMENT INTEREST

The invention described herein may be manufactured and used by or for the Government for governmental purposes.

BACKGROUND OF THE INVENTION

The present invention is germane to the propagation of polarization entangled photon pairs collinearly incident upon a modified hyperspectral birefringent filter stage and routed intact into two possible directions upon exit from the filter. Polarization entanglement is preserved.

Referring to FIG. 1, a previous similar effort, specifically the hyperspectral filter 30, was designed by Optical Physics Company and constructed under an AFRL Small Business Innovative Research (SBIR) contract award, and was solely intended as a network "hub" residing in a geostationary or geosynchronous orbit. Its mission is to support low probability of detection, interception, and exploitation links at very high data rates simultaneously to several users nearer to or on earth over a geographical region roughly the size of the Midwest United States. Such users will henceforth be referred to as "spokes." A hub and spoke network configuration, electromagnetic beams transporting information between the spokes near earth and the hub at geo orbit are comprised of many photons, say in the 1550 nm band. They are classical electromagnetic beams, fully describable by classical electrodynamics.

As previously mentioned, an existing patented birefringent spectral filter stage, U.S. Pat. No. 7,400,448, was awarded to Richard Hutchins, Optical Physics Company [1] and manifested in SBIR contract FA8750-11-C-0163. It is intended for securing free space laser communications applications where robust wide angle acceptance in both azimuth and elevation is required. In U.S. Pat. No. 7,400,448, optical signals from the spokes are assigned distinct frequencies in the telecom band and possess common incident polarizations oriented 45° with respect to the optical axis of a set of birefringent spectral plates. A birefringent filter stage 10 is comprised of the birefringent plates, called a Lyot filter or birefringent stack, (also referred to as birefringent filter stack or filter stack) 10, followed by a polarization beam splitter 20, as shown in FIG. 1. The polarization beam splitter's 20 plane of incidence is oriented 45° with respect to the birefringent stack 10. It is therefore oriented in concert with the incident beams.

The primary contribution of U.S. Pat. No. 7,400,448 to OPC was to find an innovative way to increase the angular acceptance for simultaneous, multi-access laser communications employing wavelength division multiplexing to distinguish distinct, spatially displaced users. U.S. Pat. No. 7,400,448 incorporates a broadband half-wave plate between two birefringent plates whose extraordinary axes are perpendicular to one another and to the propagation direction of the laser light. Incoming frequencies whose optical path difference phase over the Lyot filter stack is an even integral multiple of $\pi$ will suffer no polarization change in transit through the filter. We call these frequencies congruent. However, incoming frequencies whose optical path difference phase is an odd multiple of $\pi$ will suffer polarization rotations by 90°. We call these frequencies incongruent. Incoming congruent and incongruent beams are split into orthogonal directions at a polarization beam splitter, or PBS. Thus, the hyperspectral Lyot filter stack prepares incoming beams for spatial separation by the PBS, accomplishing wavelength division multiplexing for classical laser beams. Those classical laser beams initially possess common polarizations preset to be 45° with respect to the filter reference frame. Their polarizations are, however, coincident with the PBS frame which is oriented 45° with respect to the Lyot filter frame of reference. After exiting the Lyot filter stack, one set of beams, say the congruent set, possess polarizations orthogonal to the PBS plane of incidence; they reflect from the splitting surface. Incongruent beams possess polarizations parallel to the PBS plane of incidence and transmit through the splitter interface.

Another feature of U.S. Pat. No. 7,400,448 is the incorporation of moveable wedges which can tune the optical thickness of the birefringent wedges to select desired transmission frequencies. This is the primary application U.S. Pat. No. 8,427,769 to Raytheon employs in their Lyot fitter tuning device. U.S. Pat. No. 8,427,769 accomplishes a very fine frequency tuning of a laser beam by passing the beam multiple times through the tunable aspect of the wedges deployed in one aspect of the U.S. Pat. No. 7,400,448 to OPC Lyot filter, where again, OPC's filter is not critical to the U.S. Pat. No. 8,427,769 to Raytheon application. It is simply one medium to accomplish one function the multipass Raytheon patent employs to tune a laser beam to a desired frequency. The present invention could perhaps utilize this capability for future use, but is not compatible with the present invention at this because the present invention instead switches the routing by adjusting the incoming frequencies for a given static Lyot stack thickness, and thus achieving its goal of preserving the polarization entanglement.

Still referring to FIG. 1, distinct input frequencies from the distant spokes are either congruent or incongruent with respect to the filter stack 10. In traversing the filter stack 10, polarization states of congruent frequencies are not rotated, while polarization states of incongruent frequencies are rotated by 90°. The two polarization states possessed by each beam exiting a filter stack 10 are either transmitted or reflected at the splitting interface within the polarization beam splitter 20. In other words the filter stack 10 prepares incoming beams for splitting into orthogonal directions by the polarization beam splitter 20, thus enabling wavelength division multiplexing (WDM) for simultaneous access between the network "hub" and its spatially distributed "spokes." Moreover, if classical beams comprising a sum of vertical and horizontal polarized states containing many photons of two distinct frequencies are propagating along a line and entering the hyperspectral filter stage 30, one will measure both horizontal and vertical polarized states exiting the beam splitter at both output ports. The beams are a sum of electric field amplitudes comprising many photons. An entangled photon pair state is different; beams are divisible, single photons are not. Yet a pair of single photons generated by interactions at their source, such as four wave mixing in an optical fiber pumped by a sufficiently intense laser pulse, can possess two possible polarization states. They are either both horizontally polarized along the same coordinate axis, or they are both vertically polarized along an orthogonal axis. Both such possibilities are equally probable, but the state is unknown until measurement. Their joint probability quantum amplitude is expressed as a sum of product probability amplitudes, $$|\Gamma(f_1; f_2)\rangle_{in} = \frac{1}{\sqrt{2}}(|f_1, H_1, P_1; f_2, H_2, P_1\rangle + |f_1, V_1, P_1; f_2, V_2, P_1\rangle) \quad (1)$$

Equation (1) expresses the input quantum state as a collinearv entangled photon pair prior to entering the hyperspectral filter stage 30 at $P_1$. The term on the left of the plus sign is the probability amplitude that the joint state contains two photons, one with congruent frequency, $f_1$, and one with incongruent frequency, $f_2$. Both are horizontally polarized, and both are incident on port $P_1$ in FIG. 1. The term on the right of the plus sign is the probability amplitude that the joint state contains two photons, one with congruent frequency, $f_1$, and one with incongruent frequency, $f_2$. Both are vertically polarized, and both are collinearly incident on port $P_1$ in FIG. 1. The probability of measuring the product state on the left is the square of the coefficient multiplying it, here equal to ½. Similarly, the probability of measuring the product state on the right is ½.

Polarization measurement entails projection of the state onto detectors wherein the photon's energy is converted into an electrical signal; the photon is destroyed, its energy converted to electricity. In such a process, measurement of horizontal polarization of one photon necessitates horizontal polarization of the other. The measurements are 100% correlated. Likewise, vertical polarization measured on one photon necessitates vertical polarization on the other. Again, measurements are 100% correlated. Either possible outcome of a polarization measurement on the two photons occurs at random and, as stated above, equally probable. In no case is horizontal polarization measured on one photon and vertical polarization measured on the other. These correlations arise from conservation of energy and angular momentum at the source of the photons, and subsequent engineered assurance that both possibilities exist until measurement of the initial state, i.e., by entangling the two possibilities. Assigning logic bit 1 to horizontal polarization and logic bit 0 to vertical polarization, polarization measurements on the entangled state generates a random bit stream, useful for cryptographic purposes and quantum information processing applications. In other words, an entangled polarization state can be a carrier of random numbers which can be securely shared between two parties.

It is important to note that if the photons are split into two distinct directions as a function of frequency, and their polarizations are measured in two non-orthogonal two dimensional bases oriented relative to one another by 45°, ambiguity is imparted to the value of a logic bit when the two polarization bases are different. For example, in a quantum key distribution protocol application where legitimate users share common knowledge of which basis is used in every transmission between them, security is enhanced under intercept and reseed attacks by an eavesdropper who does not share the common basis choice. Eavesdroppers will be wrong a discernible fraction of the time, alerting legitimate users of their intrusion. This added security measure is not present in utilization of the frequency for secret key generation in the state given by equation (1).

Frequency measurements of the initial state in equation (1) are not random. They occur in either possible measurement as a deterministic pair. The frequency degree of freedom comprises just one two-dimensional basis, not the two, two dimensional bases of polarization. In other words, the frequency degree of freedom is not as intrinsically secure as polarization degrees of freedom for random number generation utilized in quantum cryptography.

When congruent frequency $f_1$ and incongruent frequency $f_2$ are both horizontally polarized, transit through the birefringent stack 10 leaves the congruent frequency polarization intact, but rotates the incongruent frequency by 90°, to a vertical polarization state. Or, if the two photons are vertically polarized, again, the congruent frequency photon's polarization state is left intact, remaining vertical, but the incongruent photon's polarization state is rotated from vertical to horizontal polarization. The joint probability amplitude exiting the polarization beam splitter 20, and thus the hyperspectral filter stage 30 becomes, $$|\Gamma(f_1; f_2)\rangle_{out} = \frac{1}{\sqrt{2}}(|f_1, H_1, P_2; f_2, V_2, P_3\rangle + |f_1, V_1, P_3; f_2, H_2, P_2\rangle) \quad (2)$$

Transiting the polarization beam splitter 20, the two photons are directed into two orthogonal directions. The polarization beam splitter 20 is a projection operator. Horizontal polarizations exit $P_3$ in FIG. 1 and vertical polarizations exit $P_2$. Polarization measurements of a photon exiting $P_3$ are no longer randomly distributed, nor are polarization measurements exiting $P_2$. Thus, the polarization randomness of the input state given in equation (1) is lost upon projection and subsequent measurement. In terms of information utility, they behave like the frequency behaves prior to entering the hyperspectral filter stage 30 i.e., like one two dimensional basis without randomness. Frequency measurements, however, are random. After transiting the hyperspectral filter stage 30, they can provide anti-correlated random bit streams at either port. If the output of $P_2$ is $f_1$, the output of $P_3$ is $f_2$, and vice versa.

Useful polarization entanglement is lost and replaced by less useful frequency entanglement. The difference in utility is the fact that polarization entanglement allows for measuring in at least two, two dimensional bases, while frequency entanglement allows measurement in only one two dimensional basis. For quantum key distribution purposes, two non-orthogonal two dimensional bases allow ambiguity in an eavesdropper's interpretation of the logical meaning of their measurements. One two dimensional frequency basis does not allow such ambiguity to be imparted to an eavesdropper. It is therefore desirable to modify the single hyperspectral filter stage 30 to recover the more intrinsically secure polarization entanglement.

OBJECTS AND SUMMARY OF THE INVENTION

Key to free space operation is the capability to accept light incident on a telescope aperture in which the hyperspectral birefringent filter accepts various angles of incidence in both azimuth and elevation. A prior art design of reference [1] (see FIG. 1) ensures robust angular acceptance. Its frequency resolution can be varied, but is typically designed to accommodate the ITU 200 GHz telecommunications grid. It can be configured for greater or lesser frequency discrimination. Wavelength tunable sources for classical communications are required as input to the prior art design, and by extension to the present invention presented here entailing quantum communications.

In an embodiment of the present invention, an apparatus for routing polarization entangled photon pairs, comprises a first polarization beam splitter having a first input, a first output and a second output, where the first and second outputs are orthogonal to each other; a first birefringent filter stack coincident with the input of the first polarization beam splitter into which a entangled photon pair is input; a second birefringent filter stack coincident with the first output; a third birefringent filter stack coincident with the second output; a second polarization beam splitter having a second input, a third input, a third output and a fourth output wherein the second and the third inputs are orthogonal to each other and where the third and fourth outputs are orthogonal to each other; a first mirror coincident with first output oriented so as to direct photons from first output into the second input; and a second mirror coincident with the second output oriented so as to direct photons from the second output into the third input.

In other embodiment of the present invention, a method for creating correlated polarization measurements of photons at distinct locations, comprises the steps of a first step of rotating the phase of those photons in a polarization entangled photon pair having incongruent frequencies; directing the polarization entangled photon pair into a first beam splitter; a first step of passing those photons having a polarization aligned with a first beam splitter and reflecting in an orthogonal direction those photons having a polarization not aligned with the first beam splitter; a second step of rotating the phase of those photons having been passed having incongruent frequencies and those photons having been orthogonally directed having incongruent frequencies; directing the passed and the orthogonally directed photons into a second beam splitter; and a second step of passing those photons having a polarization aligned with the second beam splitter and reflecting in an orthogonal direction those photons having a polarization not aligned with the second beam splitter; and measuring the polarization of said photons exiting said second polarization beam splitter.

Briefly stated, the present invention, a photon entanglement router, comprises a modified birefringent spectral filter followed by a polarization beam splitter (PBS). Frequency degenerate or non-degenerate entangled photons, generated by a collinear laser source and incident on one input port of the photon entanglement router, are comprised of congruent photons and/or incongruent photons. The invention adds a plurality of additional filter stacks at each output port such that they invert the action of the first birefringent stack at the input port. Intermediate output photons from the invention is input to two ports of an additional PBS where they are spatially projected according to their frequencies and polarizations. Two congruent photons of an entangled photon pair exit as an entangled pair in one direction, while two incongruent photons exit as an entangled pair in the orthogonal direction. If one photon is congruent and the other photon incongruent, the photons remain entangled but are spectrally divided into orthogonal directions. The invention's birefringent spectral filter accepts specific input frequencies from the ITU optical C-band grid for proper operation.

Referring to FIG. 2, the present invention considers non-classical electromagnetic propagation through a modified hyperspectral filter stage known herein as a photon entanglement router 40. Such non-classical photon propagation entails entangled photon pairs collinearly incident on birefringent filter stacks $L_1$, $L_2$, and $L_3$ 50, 60, 70, modified to preserve and route polarization entanglement. A major difference between the non-classical incident energy and classical electromagnetic incident energy is this: the latter polarization states are known with certainty, while the former two photon polarization states are unknown; they can be either horizontally polarized or vertically polarized with respect to the photon entanglement router's 40 optical axes. Entanglement constrains the two photons' relation to one another in that they are either both horizontally polarized or both vertically polarized and randomly so. The principal use of the present invention's birefringent filter stacks 50, 60, 70 is to preserve polarization correlations by recovering useful entanglement between photons exiting the hyperspectral filter stage 40 and spatially direct it for further quantum information processing operations.

Still referring to FIG. 2, the present invention improves upon the prior art hyperspectral filter stage (see 30, FIG. 1), and recovers polarization entanglement in the sense that each possible polarization in each photon exits the photon entanglement router 40 randomly and 100% correlated. For one photon frequency congruent and the other incongruent, one photon exits into one direction, the other photon into an orthogonal direction. Moreover, if both photons are congruent with respect to the photon entanglement router 40 (see FIG. 3), or both incongruent with respect to the photon entanglement router 40 (see FIG. 4), the entire input entangled state can be routed into one direction or the orthogonal direction respectively. Thus, controlling the frequency or the birefringence of the birefringent filter stack 50, 60, 70, the present invention's hyperspectral filter stage 40 acts as a routing switch, assuring polarization correlations remain intact and random via preservation of their entangled joint probability amplitude.

The present invention considers non-classical electromagnetic photon propagation through a modified hyperspectral filter stage referred to as a photon entanglement router 40 involving just two photons possessing a quantum mechanical coherence relation called polarization entanglement. In the absence of loss and decoherence, the present invention's hyperspectral filter stage ensures 100% correlation of polarization measurements between the two photons exiting the photon entanglement router 40.

This invention also allows for just one photon of the polarization entangled pair to be routed in one particular direction, while routing the other photon of the polarization entangled pair into another, distinct direction. Reiterating, passively operating on a collinear input entangled photon pair, the present invention's modified hyperspectral stage 40 allows for routing intact an entangled pair into one or an orthogonal direction, or to distribute one photon of the pair into one direction and the other into a distinct direction while maintaining the quantum entanglement between them.

Referring to FIG. 2, the present invention, a photon entanglement router 40, comprises a modified birefringent filter stack $L_1$ 50 followed by a first polarization beam splitter (PBS) 20. Frequency degenerate or non-degenerate entangled photons, generated by a collinear laser source and incident on one input port of the photon entanglement router 40, are comprised of congruent photons and/or incongruent photons. The invention adds a plurality of additional birefringent filter stacks $L_2$ and $L_3$ 60, 70 at each output port such that they invert the action of the first birefringent stack $L_1$ 50 at the input port. Then, the photons are input to two ports of a second PBS 100 via mirrors 80, 90 where they are spatially projected according to their frequencies and polarizations. Two congruent photons of an entangled photon pair exit as an entangled pair in one direction, while two incongruent photons exit as an entangled pair in the orthogonal direction. If one photon is congruent and the other photon incongruent, the photons remain entangled but are spectrally divided into orthogonal directions. The birefringent filter stacks 50, 60, 70 accept specific input frequencies from the ITU optical C-band grid for proper operation.

DETAILED DESCRIPTION OF THE PREFERRED EMBODIMENT

Figure 1:
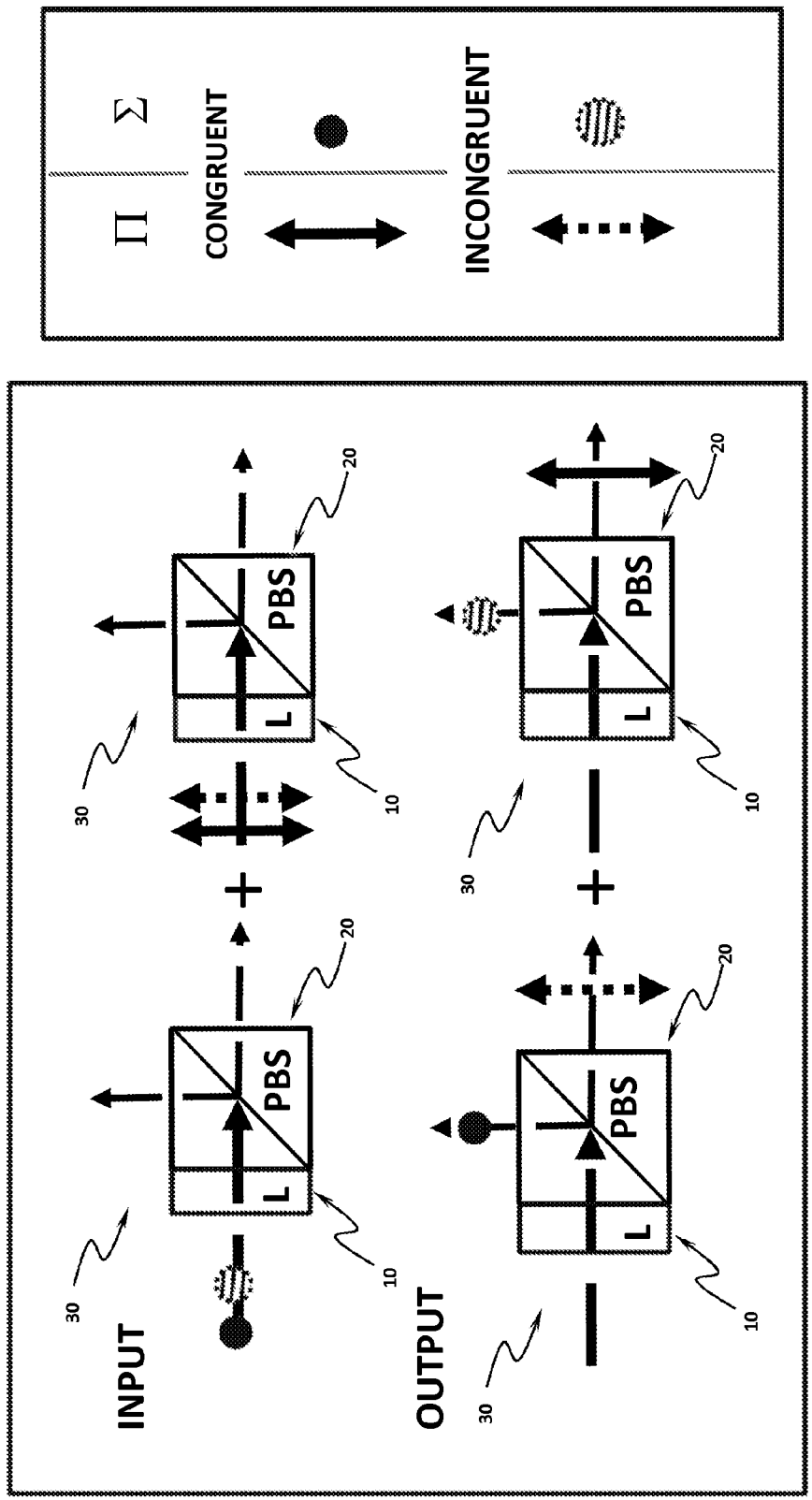
FIG. 1 is a diagram of a prior art hyperspectral birefringent filter.

The present invention makes use of the foregoing aspect of the OPC filter of U.S. Pat. No. 7,400,448, though is not dependent on that particular filter. Other birefringent media, including strictly electro-optic media, could accomplish the same thing. However, it is preferable to utilize the OPC filters in the implementation of the present invention because they are largely passive, have wide angular acceptance in both horizontal and vertical dimensions, and have accompanying electro-optical media performing fine tuning to compensate for temperature variations. A major difference between OPC's design and the present invention is that the OPC configuration distributes classical signals according to frequency into distinct end points, for high rate and simultaneous multi-access users. A typical input state is shown in the following equation (3.), a product state.

$$|\Psi_{class}\rangle_{in} = |f_1, \Sigma, z, N; f_2, \Sigma, z; N\rangle \quad (3)$$

The semicolon designates the fact that there are two beams, one with congruent frequency $f_1$, the other with incongruent frequency, $f_2$, and both possessing huge numbers, N, of photons that are propagating along the z axis. Both have the same polarization, $\Sigma$, perpendicular to the PBS plane of incidence. Transiting the birefringent Lyot stack, then the PBS, the state is transformed into equation (4).

$$|\Psi_{class}\rangle_{out} = |f_1, \Sigma, x, N; f_2, \Pi, z; N\rangle \quad (4)$$

The output state has been split into two beams, a congruent one with frequency $f_1$ propagating along the x-axis and possessing polarization $\Sigma$, and the other incongruent beam, with frequency $f_2$, whose polarization has been rotated to $\Pi$, parallel to the PBS plane of incidence. It is propagating along the z-axis.

In contrast to the OPC or Raytheon designs, the design requirement for the present invention must accommodate the possibility for either $\Sigma$ or $\Pi$ incident product states being randomly input into the birefringent Lyot stage. That composite state is a linear combination of product states. It is shown in equation (5).

$$|\Psi_{entang}\rangle_{in} = \frac{1}{\sqrt{2}}|f_1, \Sigma, z, 1; f_2, \Sigma, z; 1\rangle + \frac{1}{\sqrt{2}}|f_1, \Pi, z, 1; f_2, \Pi, z; 1\rangle \quad (5)$$

The state of equation (5) contains just two photons, but with two possible measurement Outcomes. The state on the left is the possibility that both photons are $\Sigma$ polarized, while the state on the right is the possibility that both are $\Pi$ polarized. Transiting the hyperspectral birefringent Lyot filter stage, the state is transformed into equation (6).

$$|\Psi_{entang}\rangle_{out} = \frac{1}{\sqrt{2}}|f_1, \Sigma, x, 1; f_2, \Pi, z; 1\rangle + \frac{1}{\sqrt{2}}|f_1, \Pi, z, 1; f_2, \Sigma, x; 1\rangle \quad (6)$$

In (6), note that the state on the left has one $\Sigma$ polarized photon exiting along x, while the other $\Pi$ polarized photon exits along z; so, too, in the state on the right. It also has a $\Sigma$ polarized photon exiting along x, while the other $\Pi$ polarized photon exits along z. Thus the randomness associated with polarization has been lost. That randomness has been transferred to the frequency degree of freedom. Congruent frequency exits out x on the left possibility, but exits out z on the right possibility. Conversely, the incongruent frequency exits out z on the left possibility, but exits out x on the right possibility. Only one possibility will be measured and while the polarization degree of freedom is not randomly distributed out both exits, the frequency degree of freedom is. The latter entanglement is more useful because it possesses randomness.

The problem with just frequency entanglement (and therefore the shortcomings of U.S. Pat. No. 7,400,448 to OPC and U.S. Pat. No. 8,427,769 to Raytheon) is that it is a degree of freedom with just two basis states, $f_1$ and $f_2$. These cannot change. Polarization, on the other hand, can be rotated to produce as many two dimensional bases as one wishes. The most useful two dimensional bases are those two associated with the PBS frame of reference and the Lyot stack frame of reference. They are oriented 45° relative to one another. These two, two dimensional polarization bases allow maximum ambiguity to an eavesdropper attempting to sift information shared between two legitimate users in a cryptographic application. Thus the present invention's design intent is to recover useful polarization entanglement possessing its former measurement randomness.

The configuration of the present invention restores randomness to the polarization measurement statistics by inserting two additional birefringent Lyot stacks into both paths exiting the OPC Lyot filter stage after the PBS. These Lyots stacks are identical to the initial Lyot stack. They invert incongruent frequency polarizations but leave congruent frequency polarizations intact. Thus, the initial polarization states of the two photons are recovered, but now path separation has been performed for spatial distribution. Hence, when passed through one additional PBS, a congruent photon will go in one direction, while an incongruent photon will go in another direction. This is shown in equation (7).

$$|\Psi_{modified}\rangle_{out} = \quad (7)$$

-continued $$\frac{1}{\sqrt{2}}|f_1, \Sigma, x, 1; f_2, \Sigma, z; 1\rangle + \frac{1}{\sqrt{2}}|f_1, \Pi, x, 1; f_2, \Pi, z; 1\rangle$$

Equation (7) states that congruent frequencies always exit the second PBS of the modified system along x, while incongruent frequencies always exit the second PBS of the modified system along z. Frequency measurement statistics are no longer random. However, polarization measurement statistics are now random. Either $\Sigma$ or $\Pi$ polarizations will exit along x or z randomly. Since polarizations can be rotated, two, two dimensional bases can be employed for cryptographic applications.

This is just one novel and non-obvious capability the present invention's entanglement preserving configuration accomplishes. By selecting both input frequencies to be either congruent or incongruent, the present invention can send the entangled pair to two orthogonal directions for further quantum processing.

Referring to FIG. 1, in transit through a polarization beam splitter (PBS) 20, polarization states are split into two orthogonal directions according to whether their polarization is perpendicular or parallel to the plane of incidence on the splitting surface within the PBS. A more suitable designation for the polarization states before and after the PBS are the designations $\Sigma$ and $\Pi$, for polarizations perpendicular to the PBS plane of incidence and parallel to the plane of incidence respectively. Thus the entangled pair probability amplitudes, equations (1) and (2), read $$|\Gamma(f_1; f_2)\rangle_{in} = \frac{1}{\sqrt{2}}(|f_1, \Sigma_1, P_1; f_2, \Sigma_2, P_1\rangle + |f_1, \Pi_1, P_1; f_2, \Pi_2, P_1\rangle) \quad (8)$$

$$|\Gamma(f_1; f_2)\rangle_{out} = \frac{1}{\sqrt{2}}(|f_1, \Sigma_1, P_2; f_2, \Pi_2, P_3\rangle + |f_1, \Pi_1, P_3; f_2, \Sigma_2, P_2\rangle)$$

FIG. 1 illustrates equations 8, the propagation of polarization states through a prior art hyperspectral filter stage 30. A legend on the right identifies the symbols denoting congruency and incongruency of the states. The frequencies are necessarily distinct. L denotes a Lyot stack and PBS denotes a polarization beam splitter. Circles denote polarization states perpendicular to the PBS plane of incidence, which is oriented at 45° with respect to the Lyot stack. They are denoted by the symbol $\Sigma$. Arrows denote polarizations parallel to the PBS plane of incidence. They are denoted by the symbol $\Pi$. Congruent frequency polarization states, denoted by solid symbols, remain invariant, while incongruent frequency states, denoted by dashed symbols, are rotated by 90° in transit through a Lyot stack. These quantum operations on the input states prepares them for projection at the PBS interface.

Figure 2:
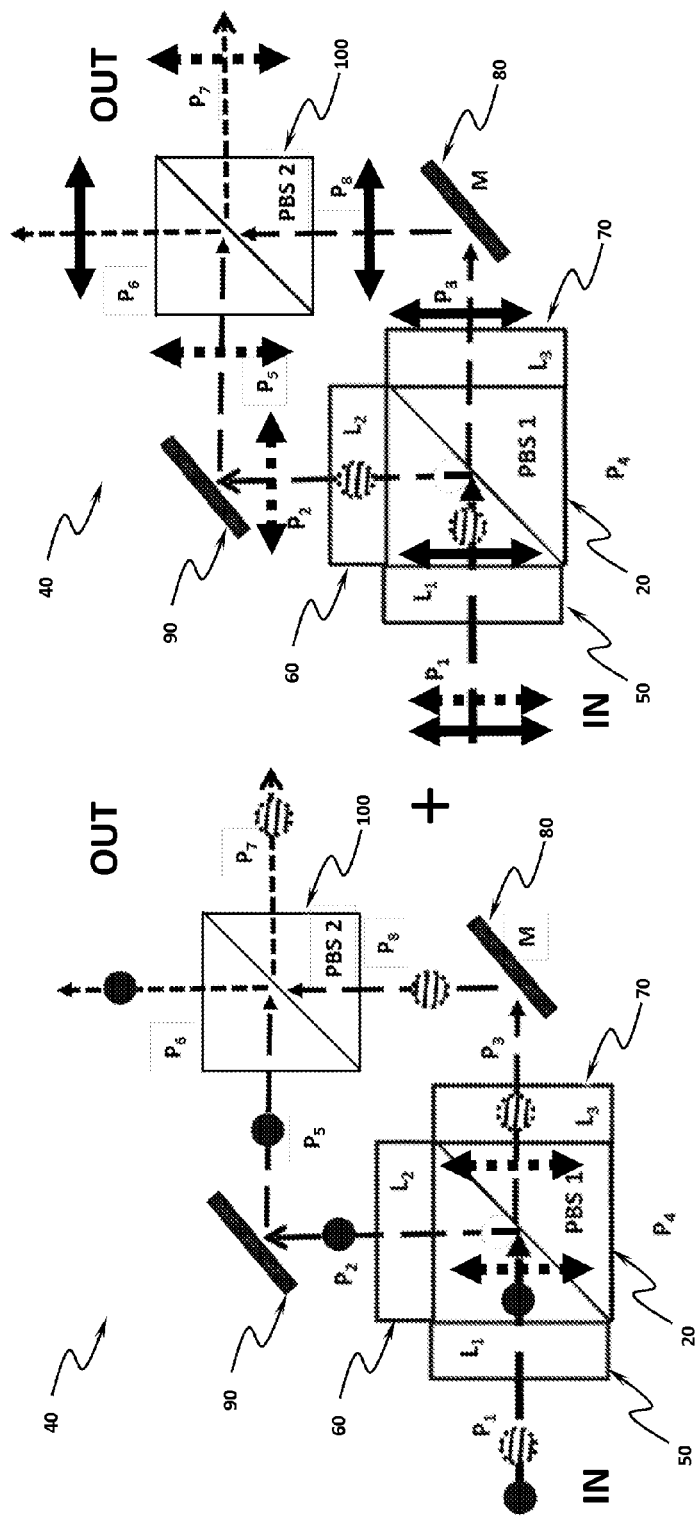
FIG. 2 is a diagram of the present invention photon entanglement router showing the objects of the invention wherein one frequency is congruent and one frequency is incongruent with respect to the Lyot filter stacks, all of which here are identical.

Referring to FIG. 2, the present invention improves upon the prior art through the addition of at least two more birefringent (Lyot) filter stacks $L_2, L_3$ 60, 70 to the existing hyperspectral filter stage 30 and the addition of at least one more polarization beam splitter 100. These improvements over the prior art serve to both route and preserve polarization entanglement in the following three ways that depend on choice of input frequencies:

Adding additional birefringent filter stacks 60, 70, as in one embodiment where one in each path after the photon entanglement router's 40 polarization beam splitter 20 is added, leaves invariant congruent frequency polarization states that pass through them. However, the additional birefringent filter stacks 60, 70 invert incongruent frequency polarization states by an additional 90° so that their polarizations are returned back to their original input state. Also, adding mirrors 80, 90 direct the photons into an additional polarization beam splitter 100 after the two additional birefringent filter stacks 60, 70 as in one embodiment directs the congruent frequencies in one direction (i.e., passed through unredirected) and the incongruent frequencies in a spatially distinct direction (i.e., reflected in an orthogonal direction). In effect, this device breaks up the collinear input entangled state into its respective qubit states, while retaining the entanglement constraint expressed by the joint distribution expressed in the lower equation of FIG. 2, which is the output state.

In FIG. 2, a measurement at $P_6$ will reveal either a congruent $\Sigma$ state, or a congruent $\Pi$ state. Similarly, a measurement at $P_7$ will reveal an incongruent $\Sigma$ state or an incongruent $\Pi$ state. When taken together, those measurements will reveal either a congruent $\Sigma$ state and an incongruent $\Sigma$ state, or a congruent $\Pi$ state and an incongruent $\Pi$ state. This is a manifestation of polarization entanglement; polarization measurements at distinct locations are correlated.

Figure 3:
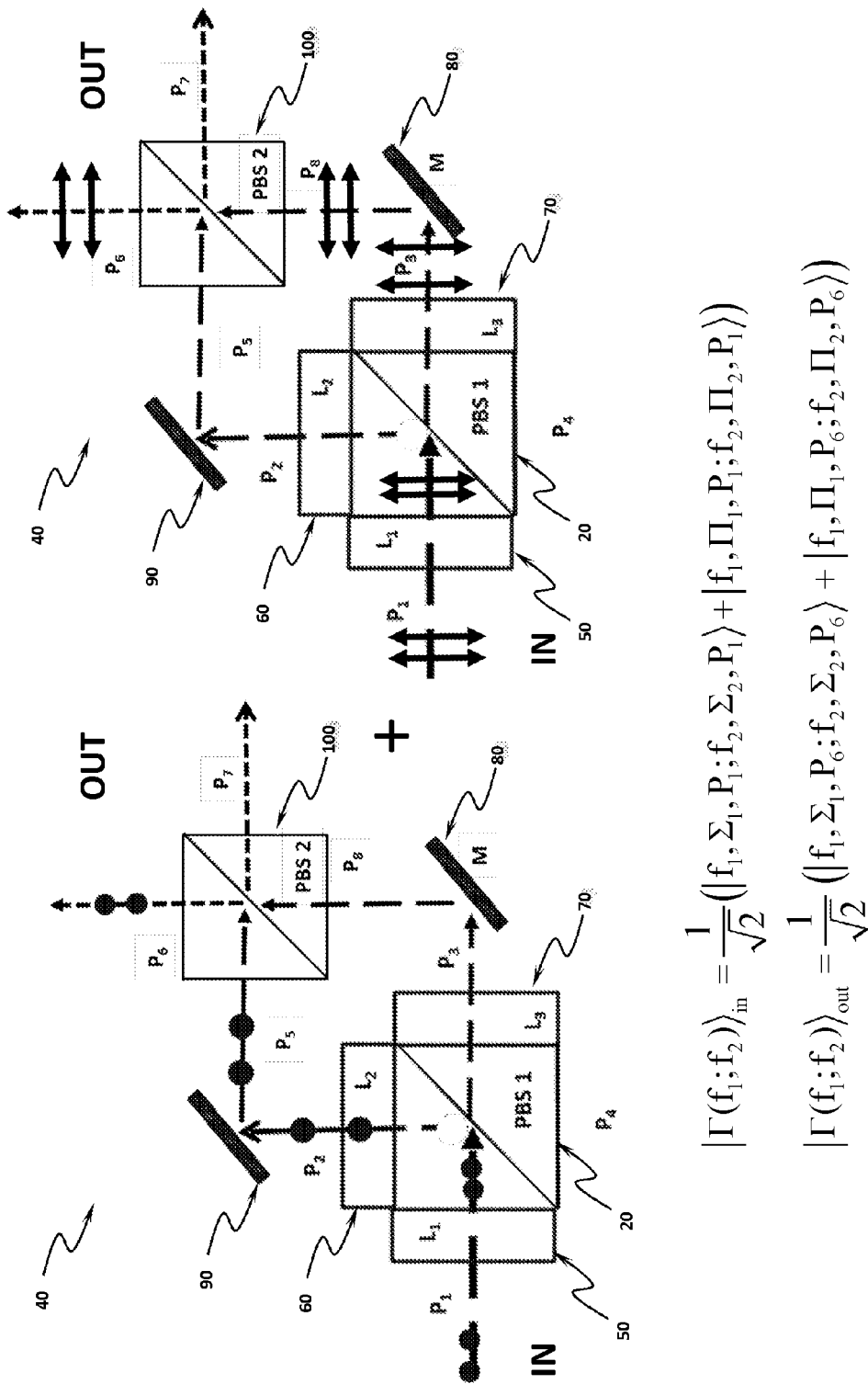
FIG. 3 is a diagram of the present invention photon entanglement router showing the objects of the invention wherein both frequencies are congruent with respect to the Lyot filter stacks, all of which here are identical.

In FIG. 3, where both entangled photon frequencies are congruent, but not necessarily equal, the present invention directs the output entangled pair into a spatial direction perpendicular to the input direction. Polarization measurements at $P_6$ will reveal either two $\Sigma$ polarization states, or two $\Pi$ polarization states.

Figure 4:
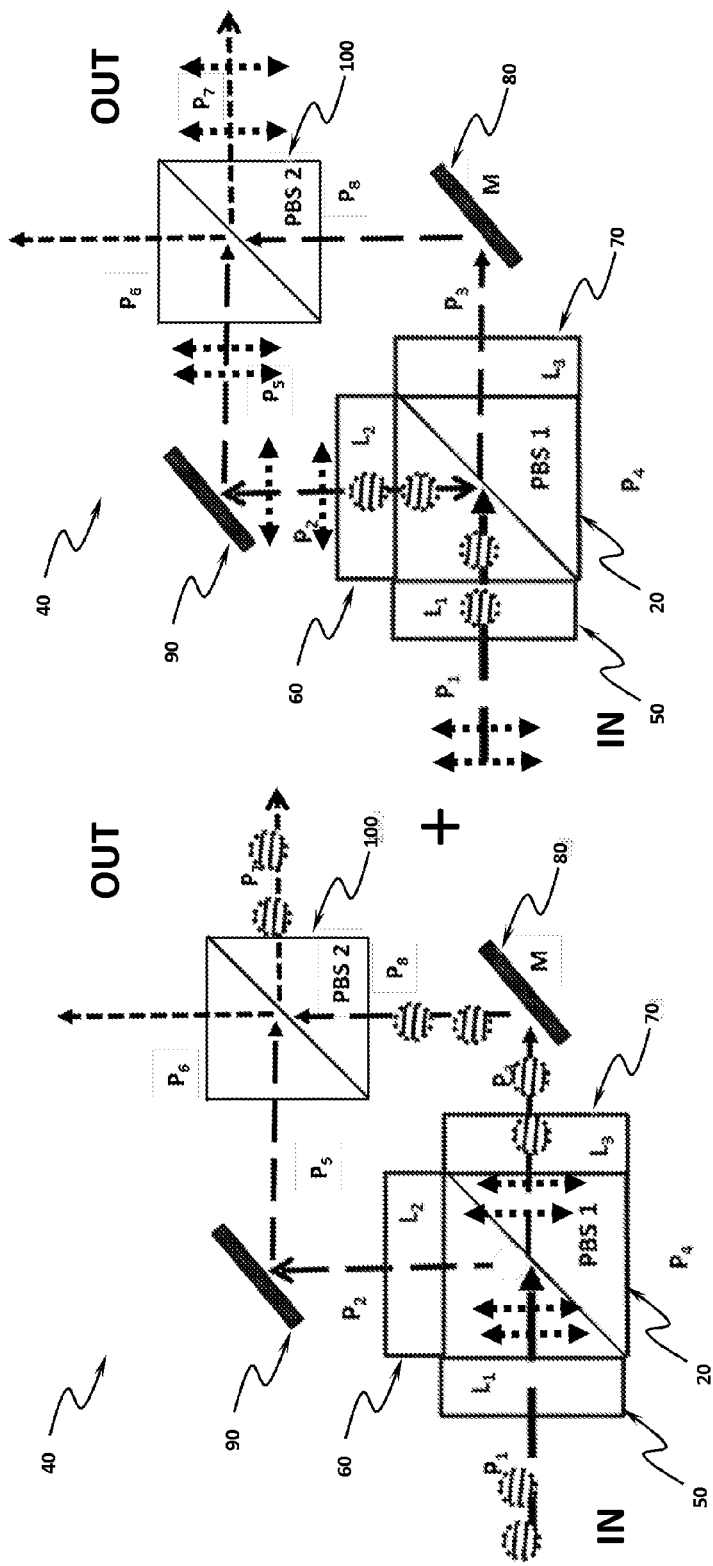
FIG. 4 is a diagram of the present invention photon entanglement router showing the objects of the invention wherein both frequencies are incongruent with respect to the Lyot filter stacks, all of which here are identical.

In FIG. 4, where both entangled photon frequencies are incongruent, but not necessarily equal, the present invention directs the output entangled pair into a spatial direction parallel to the input direction. Polarization measurements at $P_7$ will reveal either two $\Sigma$ polarization states, or two $\Pi$ polarization states.

In all cases, initial polarization entanglement is preserved at the output. A measurement of horizontal polarization on one photon necessitates horizontal polarization on the other. Likewise, vertical polarization measured on one photon necessitates vertical polarization on the other. In no case is horizontal polarization measured on one photon and vertical polarization measured on the other.

What is claimed is:

1. A method for creating correlated polarization measurements of photons at distinct locations, comprising steps of
birefringent filtering those photons in a polarization entangled photon pair having incongruent frequencies so as to rotate the polarization state thereof;
directing said polarization entangled photon pair into a first beam splitter;
beam splitting said polarization entangled photon pair so as to pass those photons having a polarization aligned with a first beam splitter and reflecting in an orthogonal direction those photons having a polarization not aligned with said first beam splitter;
birefringent filtering:
those photons having been passed having incongruent frequencies; and
those photons having been orthogonally directed having incongruent frequencies so as to invert the polarization state rotation imparted by birefringent filtering;
reflecting said passed and said orthogonally directed photons into a second beam splitter;
beam splitting said reflected photons so as to pass those photons having a polarization aligned with said second beam splitter and reflecting in an orthogonal direction those photons having a polarization not aligned with said second beam splitter; and measuring the polarization of said photons exiting said second beam splitter.

2. The method of claim 1, said steps of birefringent filtering comprise rotating said polarization state by 90 degrees.

3. The method of claim 1, said step of reflecting comprises redirecting by impingement on a mirrored surface.

4. The method of claim 1, said steps of birefringent filtering possess equivalent birefringence.

5. The method of claim 1, said step of birefringent filtering a congruent photon and an incongruent photon pair at a polarization perpendicular to said first beam splitter's plane of incidence will result in said step of beam splitting producing:

the congruent photon perpendicular to said first polarization beam splitter's plane of incidence, and the incongruent photon perpendicular to said first polarization beam splitter plane of incidence.

6. The method of claim 1, said step of birefringent filtering a congruent photon and a congruent photon pair at a polarization parallel to said first beam splitter's plane of incidence will result in said step of beam splitting producing:

the congruent photon parallel to said first polarization beam splitter's plane of incidence, and the incongruent photon parallel to said first polarization beam splitter's plane of incidence.

7. The method of claim 1, said step of birefringent filtering a first congruent photon and a second congruent photon pair at a polarization perpendicular to said first beam splitter's plane of incidence will result in said step of beam splitting producing:

the first congruent photon perpendicular to said first polarization beam splitter's plane of incidence, and the second congruent photon perpendicular to said first polarization beam splitter's plane of incidence.

8. The method of claim 1, said step of birefringent filtering a first congruent photon and a second congruent photon pair at a polarization parallel to said first beam splitter's plane of incidence will result in said step of beam splitting producing:

the first congruent photon parallel to said first polarization beam splitter's plane of incidence, and the second congruent photon parallel to said first polarization beam splitter's plane of incidence.

9. The method of claim 1, said step of birefringent filtering an first incongruent photon and an second incongruent photon pair at a polarization perpendicular to said first beam splitter's plane of incidence will result in said step of beam splitting producing:

the first incongruent photon perpendicular to said first polarization beam splitter's plane of incidence, and the second incongruent photon perpendicular to said first polarization beam splitter's plane of incidence.

10. The method of claim 1, said step of birefringent filtering an first incongruent photon and an second incongruent photon pair at a polarization parallel to said first beam splitter's plane of incidence will result in said step of beam splitting producing:

the first incongruent photon parallel to said first polarization beam splitter's plane of incidence, and the second incongruent photon parallel to said first polarization beam splitter's plane of incidence.

* * * * *